United States Patent [19]
Webb

[11] 3,929,031
[45] Dec. 30, 1975

[54] CLUTCH LOCK

[75] Inventor: Grant A. Webb, Northville, Mich.

[73] Assignee: Teleflex Incorporated, North Wales, Pa.

[22] Filed: Feb. 4, 1974

[21] Appl. No.: 439,120

[52] U.S. Cl................................ 74/501 R; 403/197
[51] Int. Cl.² .............................................. F16C 1/10
[58] Field of Search..... 74/501 R, 501 M, 502, 487; 403/105, 197; 285/39, 162, 340, 315, 316

[56] References Cited
UNITED STATES PATENTS

| | | | |
|---|---|---|---|
| 3,139,768 | 7/1964 | Biesecker.............................. | 74/501 |
| 3,627,360 | 12/1971 | Berno.................................. | 74/501 |

Primary Examiner—Samuel Scott
Assistant Examiner—Wesley S. Ratliff, Jr.
Attorney, Agent, or Firm—McGlynn and Milton

[57] ABSTRACT

A motion transmitting remote control assembly of the type for transmitting forces along a curved path by a motion transmitting core element, the assembly comprising a flexible guide means or conduit, a flexible motion transmitting core element movably supported by the guide means with the ends thereof extending from the ends of the guide means, a support member for supporting the guide means, and locking means engageable with the guide means for controlling the longitudinal movement thereof relative to the support member. The locking means includes a plurality of resilient fingers supported circumferentially about the guide means by an annular ring wherein the fingers are held in gripping engagement with the guide means, the fingers contacting the surface of the guide means at an acute angle. The resilient fingers allow relative movement between the guide means and the support member in one direction while normally preventing such movement in the opposite direction. Release means in the form of a cylindrical member slidably disposed on the guide means is provided to disengage the fingers from the guide means to allow free axial movement in both directions.

10 Claims, 4 Drawing Figures

U.S. Patent  Dec. 30, 1975  3,929,031
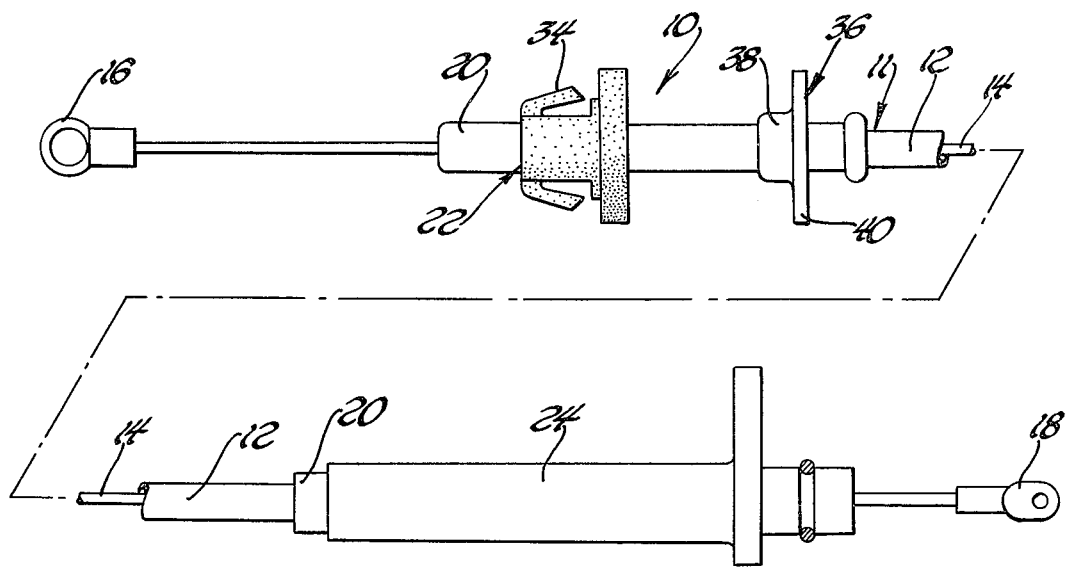
Fig. 1
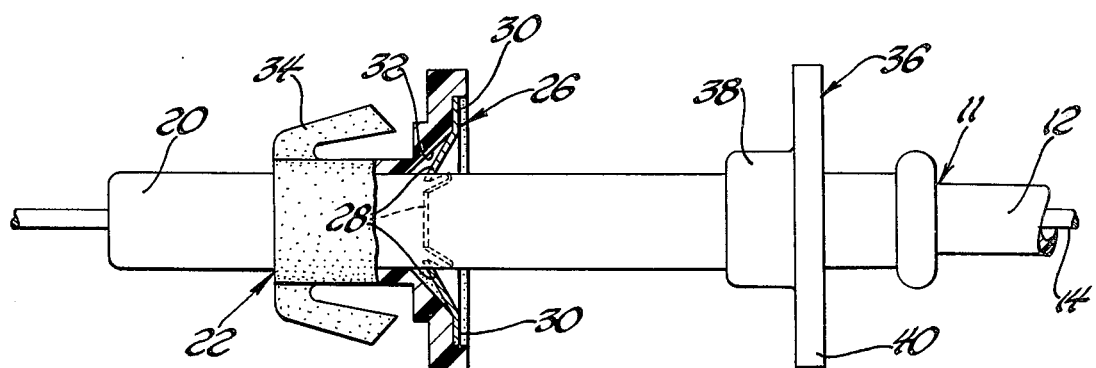
Fig. 2
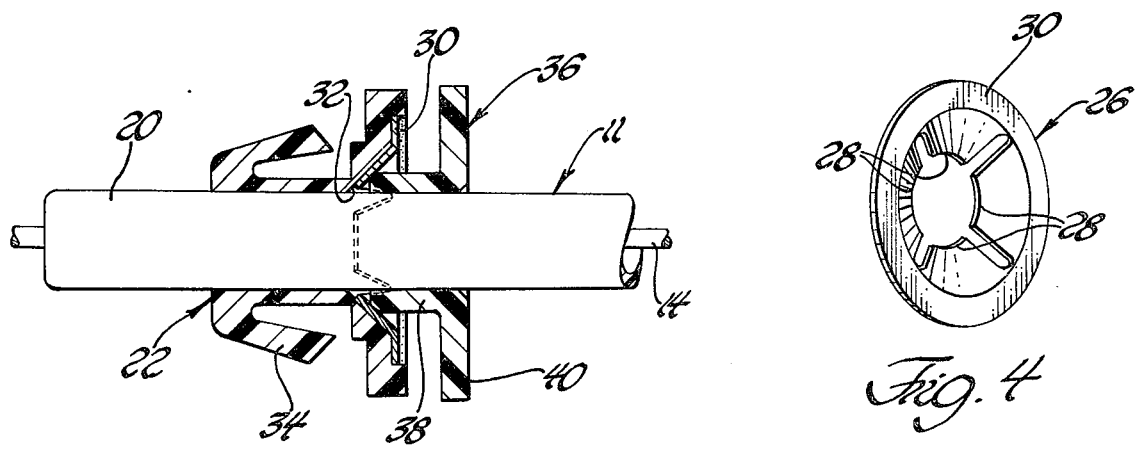
Fig. 3
Fig. 4

CLUTCH LOCK

This invention relates to a motion transmitting, remote control assembly of the type wherein motion is transmitted in a curved path by a flexible motion transmitting core element movably supported by a flexible guide means or conduit.

Assemblies of this type are widely used in the automotive industry for controlling a member which is remote from the location of the control. For example, motion transmitting remote control assemblies of this type are used as an accelerator control for controlling the amount of fuel delivered to a combustion engine through a carburetor. Normally, the conduit is attached to a support structure adjacent its ends with the ends of the core element extending therefrom. More specifically, and in the case of an accelerator control used in an automobile, one end of the conduit is attached to the fire wall while the other end is attached to a support structure conveniently near the carburetor.

It is oftentimes necessary to adjust the length of the conduit between the supports to insure that operation of the control will result in a full range of motion of the control member. Consequently, means for adjusting the length of the conduit between the supports during assembly into the system is a feature of considerable importance. Adjustment means which provide the general function as described are provided for in U.S. Pat. Nos. 3,662,617 and 3,710,645 and British Patent No. 947,536.

In these prior art assemblies locking means is provided for securely attaching the conduit to the support members to prevent relative motion therebetween when the conduit is subjected to compressive forces normally encountered during service. However, adjustment means is also provided to allow relative movement between the conduit and at least one of the support members when an excessive compressive force is applied to the conduit to enable adjustment of the length of the conduit. Additionally, many of these assemblies include manually operable release means for releasing the connection between the support member and the conduit to allow free movement therebetween should such movement be required. To provide these necessary functions, many of the prior art assemblies have resorted to relatively elaborate combinations of elements which consequently are undesirable from an economic standpoint. Other assemblies lack flexibility in that only incremental adjustment is provided rather than infinite length adjustment within the operating range.

It is a purpose of the instant invention to provide a flexible motion transmitting remote control assembly of the type described which includes locking means engageable with the flexible conduit for controlling the longitudinal movement of the conduit relative to the support member whereby adjustment of the length of the conduit is possible. Furthermore, it is a purpose of the instant invention to provide such locking means which is both relatively simple in construction and economically attractive. Additionally, it is a further purpose of the instant invention to provide release means for selectively disengaging the locking means from the conduit to allow the free axial movement of the conduit with respect to the support member.

Other purposes, objects, and attendant advantages of the instant invention will be readily appreciated as the same becomes better understood by reference to the following detailed description when considered in connection with the accompanying drawings wherein:

FIG. 1 is an elevational view of a preferred embodiment of the instant invention;

FIG. 2 is an elevational view partially broken away and in cross section of a portion of the embodiment shown in FIG. 1;

FIG. 3 is a cross sectional elevational view of a preferred embodiment of the instant invention with the elements thereof in a moved position; and FIG. 4 is a perspective view of an element of the instant invention.

Referring now to the drawings, a motion transmitting remote control assembly of the type for transmitting forces along a curved path by a motion transmitting core element is generally shown at 10. The assembly 10 includes guide means generally indicated at 11 including a flexible conduit 12 having a flexible motion transmitting core element 14 movably supported therein with the ends thereof extending from the ends of the conduit 12.

The conduit 12 is of the well known type utilized in remote control assemblies including an inner tubular member of organic polymeric or plastic material surrounded by a plurality of filaments or metal wires disposed on a long lead and encased in an outer jacket of organic polymeric material such as polyethylene or an equivalent plastic material. The flexible motion transmitting core element 14 is also of the type generally encountered and includes a metal, flexible wire-like element slidably disposed within the conduit 12. The ends of the core element 14, which extend from the ends of the conduit 12, are adapted for attachment to a control member and a controlled member. In this case, loops such as 16 or 18 are provided to attach the respective ends of the core element 14 to the control and controlled members.

The guide means 11 also includes end fittings 20. That is, the ends of the conduit 12 are normally provided with nonflexible, or rigid, end fittings 20 which are secured to the ends of the conduit 12 and are adapted to be received in suitable support members. Accordingly, a support member generally indicated at 22 is provided substantially adjacent one end of the conduit 12 for supporting the same. While the other end of the conduit is provided with another support member 24.

The support member 24 is adapted to flexibly hold the conduit 12 against longitudinal motion therewith under any circumstance. That is, the end of the conduit 12, including support member 24, is permanently fixed to the support structure when support member 24 is attached thereto.

Support member 22, on the other hand, includes locking means generally indicated at 26 engageable with the guide means 11 or, more specifically, with the end fitting 20, for controlling the longitudinal movement of the conduit 12 relative to the support member 22. The locking means 26 includes a plurality of resilient fingers 28 supported circumferentially about the end fitting 20 and in gripping engagement therewith. The resilient fingers 28 are supported by an annular ring member 30 such that the fingers 28 project radially inwardly therefrom. Furthermore, the fingers 28 contact the surface of the end fitting 20 at an acute angle whereby the fingers 28, being resilient, allow relative movement between the conduit 12 and the support member 22 in one direction, while normally preventing such movement in the opposite direction. In other words, a sufficient compressive force is capable of moving the conduit 12 and end fitting 20 through the fingers 28 from right to left as viewed in FIG. 2; however, the resilient fingers 28 will dig into and resist the movement of the conduit 12 from left to right.

The support member 22 includes a cavity 32 for receiving the locking means 26 therein. The cavity 32 is sufficiently large to enable movement of the fingers 28 the purpose for which will be hereinafter described.

The support member 22 also includes suitable flanges 34 which are adapted to provide the common snap-on fitting to mount the support member 22 in a support structure.

Release means, generally indicated at 36, is provided for disengaging the resilient fingers 28 from the surface of the end fitting 20 to allow free axial movement of the conduit 12 with respect to the support member 22 in both directions. The release means 36 includes a cylindrical portion 38 slidably disposed on the end fitting 20 and adapted to enter the cavity 32. Furthermore, the release means 36 includes a manually graspable portion 40, comprised of an annular flange, whereby the release means 36 may be manually moved along the end fitting 20 into the cavity 32. As shown in FIG. 3, the cylindrical member 38 is adapted to engage the ends of the resilient fingers 28 and move them out of engagement with the surface of the end fitting 20 to enable free axial movement of the conduit 12 with respect to the support member 22. Removing the release means 36 by sliding the same out of the cavity 32 permits the resilient fingers 28 to reengage the surface of the end fitting 20 and thereby lock it against movement with respect to the support member 22 under normal conditions.

In operation, the two support members 22 and 24 are mounted in a support structure and the length of the conduit 12 is intentionally left longer than required. The attachment loops 16 and 18 are attached to the controlled member and the control member respectively, in a suitable fashion. Under normal conditions, the lock means 26 holds the conduit 12 securely in place with respect to the support member 22. To adjust the length of the conduit 12, the control member is actuated to place the core 14 in tension with sufficient force to apply an excessive, compressive force to the conduit 12. The excessive, compressive force moves the conduit 12 through the support member 22, past the resilient fingers 28, thereby shortening the length of the conduit 12 between the support members 22 and 24. The fingers 28, however, prevent the conduit 12 from moving back through the locking means 26 to lengthen the conduit 12. In the event that such lengthening is required, however, the release means 36 is moved into engagement with the fingers 28 to disengage them from the end fitting 20 thereby enabling the conduit 12 to be moved in either direction.

The invention has been described in an illustrative manner and it is to be understood that the terminology which has been used is intended to be in the nature of words of description rather than of limitation.

Obviously, modifications and variations of the instant invention are possible in light of the above teachings. It is therefore to be understood that the invention may be practiced otherwise than as specifically described, yet remain within the scope of the appended claims.

The embodiments of the invention in which an exclusive property or privelege is claimed are defined as follows:

1. A motion transmitting remote control assembly of the type for transmitting forces along a curved path by a motion transmitting core element, said assembly comprising: a flexible guide means, a flexible motion transmitting core element movably supported by said guide means with the ends thereof extending from the ends of said guide means, a support member, said support member normally slidably supporting said guide means when said support member is in supporting relationship to said guide means to permit axial movement of said guide means with respect to said support member, and locking means supported by said support member and engageable with said guide means for controlling the axial sliding movement of said guide means relative to said support member; said locking means including a plurality of resilient fingers supported circumferentially about said guide means and extending toward said guide means to establish gripping engagement therewith, said fingers contacting the surface of said guide means at an acute angle whereby said fingers allow relative movement between said guide means and said support member in one direction when a force sufficient to overcome the gripping engagement is applied to said guide means while normally preventing such movement in the opposite direction when said guide means is supported by said support means and said fingers engage said guide means.

2. An assembly as set forth in claim 1 wherein said locking means includes an annular ring member for supporting said fingers, said fingers projecting radially inwardly therefrom.

3. An assembly as set forth in claim 2 including a release means for disengaging said fingers from the surface of said guide means to allow free axial movement of said conduit with respect to said support member in both directions.

4. An assembly as set forth in claim 3 wherein said support member includes a cavity for receiving said locking means and supporting the same therein.

5. An assembly as set forth in claim 4 wherein said release means includes a cylindrical portion slidably disposed on said conduit and adapted to enter said cavity.

6. An assembly as set forth in claim 5 wherein said release means includes a manually graspable portion for allowing manual operation thereof.

7. An assembly as set forth in claim 6 wherein said support member is adapted to be mounted in a support structure.

8. An assembly as set forth in claim 7 wherein said assembly includes a second support member substantially adjacent the other end of said guide means and adapted to be mounted in a support structure.

9. An assembly as set forth in claim 8 wherein said core element includes means for attachment to a control member and a controlled member.

10. An assembly as set forth in claim 1 including release means for disengaging said fingers from the surface of said guide means to allow free axial movement of said conduit with respect to said support member in both directions.

* * * * *